Figure 1:
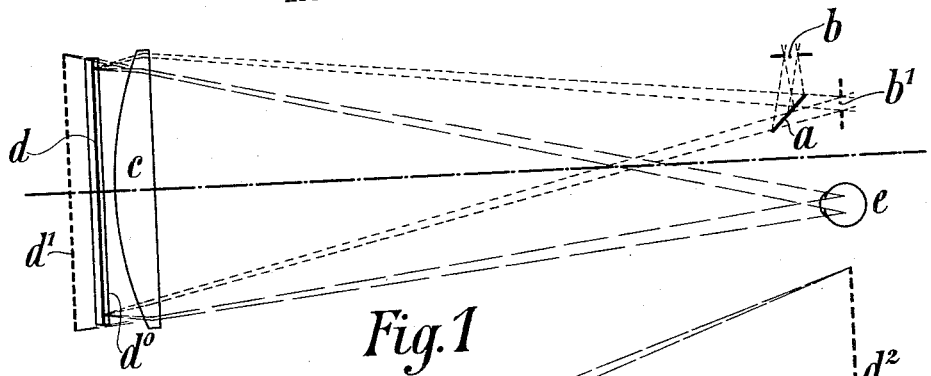

No. 890,863.

PATENTED JUNE 16, 1908.

A. KÖHLER & J. LEHMANN.
UTILIZING LIPPMANN PHOTOGRAPHS.
APPLICATION FILED SEPT. 3, 1907.

Witnesses:
Paul Krüger
Fritz Sander

Inventors:
August Köhler
Johannes Lehmann

UNITED STATES PATENT OFFICE.

AUGUST KÖHLER AND JOHANNES LEHMANN, OF JENA, GERMANY, ASSIGNORS TO THE FIRM OF CARL ZEISS, OF JENA, GERMANY.

UTILIZING LIPPMANN PHOTOGRAPHS.

No. 890,863.   Specification of Letters Patent.   Patented June 16, 1908.

Application filed September 3, 1907. Serial No. 391,098.

*To all whom it may concern:*

Be it known that we, AUGUST KÖHLER, doctor of philosophy, and JOHANNES LEHMANN, doctor of philosophy, citizens of the German Empire, and residing at Carl Zeiss strasse, Jena, in the Grand Duchy of Saxe-Weimar, Germany, have invented a new and useful Improvement in Utilizing Lippmann Photographs, of which the following is a specification.

The invention consists in an improved appliance for reproducing Lippmann photographs, under which are to be understood all photographs, which are produced by stationary waves. Photographs of this kind can be only reproduced with regularly reflected light, if a rendering of the object photographed be intended to be as true in color as possible. As a method for such reproduction Lippmann's own suggestion only is known, according to which light is made to fall in an inclined direction upon the photograph and an image of it to be projected with the assistance of regularly reflected rays through a collective lens or a collective lens system, a virtual image, if it is to be viewed direct, a real one, if it is to be visible through the means of a projection screen. Two drawbacks are inherent in this method. Firstly, in consequence of the relatively great angles of incidence the colors of the reflected rays undergo a transition towards the violet end of the spectrum. Secondly, the position of the photograph deviates by the angle of incidence from the position at right angles to the axis of the reproducing system, so that the virtual image is seen distorted and the real image on a projection screen at right angles to the axis is likewise distorted and only appears sharp in part.

In the appliance according to the present invention these drawbacks are avoided. Its principal feature is, that the axis of the reproducing lens system stands perpendicular to the plane of the photograph. Then this lens system or at least part of it may be located adjacent to the photograph to serve simultaneously as an illuminating lens system. Thus the angle of incidence, under which the illuminating rays meet the photograph, can be greatly reduced, by bringing the entrance pupil near the axis of the lens system.

In order that light may impinge on the whole surface of the photograph in a uniform manner, the entrance pupil has to be arranged in the focal plane of the illuminating system. The principal rays proceeding from the center of the pupil in that case impinge upon the photograph parallel to one another.

In order to prevent the catadioptric images of the entrance pupil, which are produced by the lens surfaces, from being projected upon the dioptric image of the photograph, the axis of the reproducing lens system may be arranged on one side of the photograph, but always perpendicular to it. The lens system is in that case used eccentrically. If this system consist of a single plano-convex piece of a lens, it may be cemented upon the photograph as a cover glass. It stands then at the same time in the place of the wedge-shaped cover glass, which is usually supplied in the case of Lippmann photographs to remove the disturbing surface reflection.

Two appliances for the production of a virtual image can be combined to form a double apparatus for viewing two identical or two stereoscopic pictures. The apparatus designed for a single picture can, however, also be arranged so as to use both eyes. Two entrance pupils are then best arranged for the light, one on the left for the entrance of the rays which are to be reflected from the photograph into the right eye, and a right one for light which after reflection at the photograph is to render the virtual image visible to the left eye.

The arrangement for projecting Lippmann photographs by producing a real image in the plane of a projection screen in comparison to an arrangement for copying such photographs to any scale shows no other fundamental difference, than that in the latter case the screen is replaced by a plate sensitive to light, adapted to Lippmann's original exposures, in a suitable dark slide.

In working with such copying apparatus more particular attention, than in merely viewing Lippmann photographs and in projecting them, should be paid that, for illumination, light be used as identical as possible in composition to that which in the original exposure the object was illuminated by.

Figure 2:
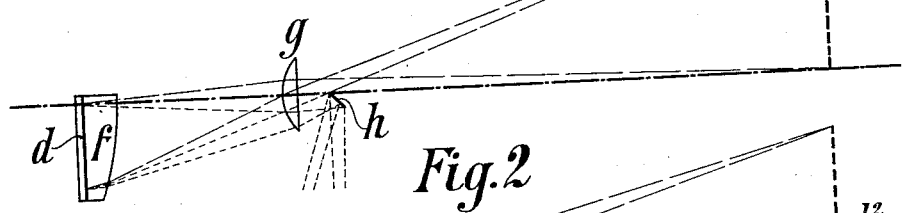
Figure 3:
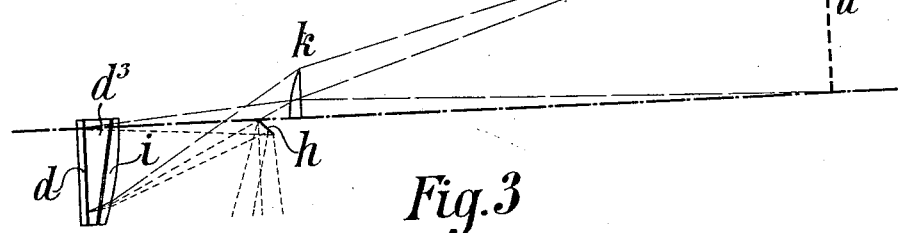
Figure 4:
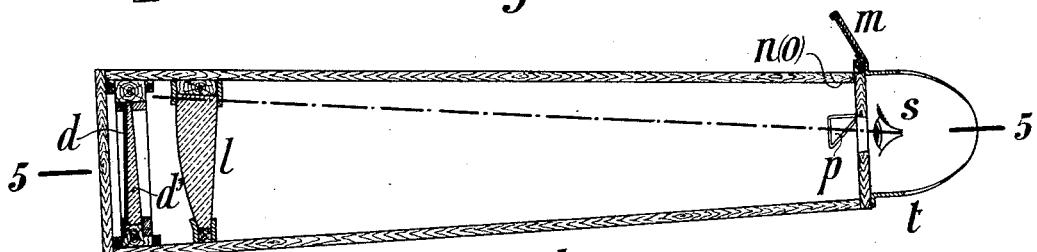
Figure 5:
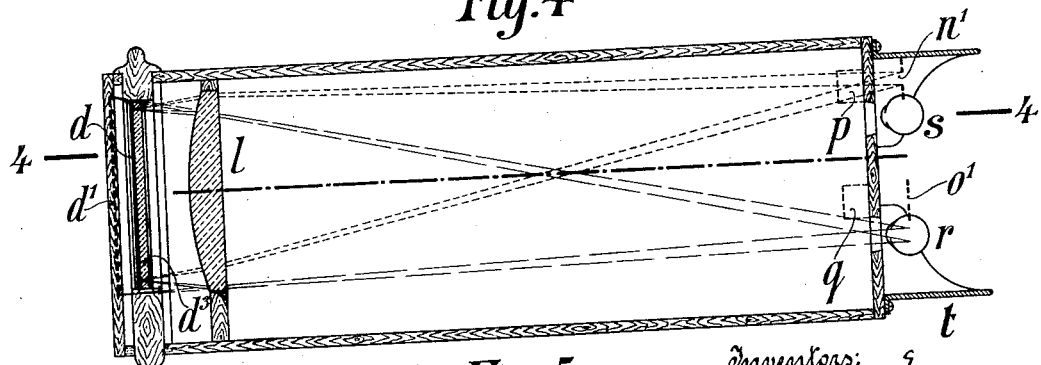

In the annexed drawing: Figure 1 is a diagrammatic plan view of an apparatus for producing a virtual image of a Lippmann photograph to be viewed with one eye. Fig. 2 is a diagrammatic view of an apparatus for producing a real image of a Lippmann photograph either for projection or copying. Fig. 3 is a diagrammatic view of another apparatus for producing a real image. Fig. 4 is a vertical section through an apparatus for producing a virtual image of a Lippmann photograph, and presenting it to both eyes. Fig. 5 is a horizontal section along the line 5—5 of Fig. 4.

In Fig. 1 the image $b^1$ of the entrance pupil $b$ projected by the mirror $a$ is situated at the focal distance of the lens $c$ and is reproduced from this and from the photograph $d$, in as far as the picture-film reflects like a plane mirror, at the position of the eye $e$. The reproducing pencils produce simultaneously a virtual image $d^1$ of the photograph $d$ behind the hinder surface of the photograph. There are no means provided in this simple example to abolish the catadioptric images of the entrance pupil, the axis of the lens $c$ passing right across the photograph $d$. The latter is provided only with a plano-parallel cover glass $d^6$.

In the arrangement of Fig. 2 presenting a real image $d^2$, the whole reproducing system, consisting in this case of two lenses $f$ and $g$, is also made use of as an illuminating system. The axis of the system lies, however, at the margin of the photograph, so that merely a portion of the lens $f$ need be employed. This portion is made plano-convex and cemented to the photograph as a cover glass. The entrance pupil lies in the plane of the mirror $h$.

The arrangement according to Fig. 3 differs from that according to Fig. 2 in that only the part $i$ of the reproducing system near the photograph takes part in the illumination but not the half lens $k$. The photograph is besides provided with a wedge-shaped cover glass $d^3$, near to which the lens $i$ lies with a sloping plane surface in such a manner, that only a thin plano-parallel stratum of air is between both surfaces so that hardly any influence is exerted on the path of the rays by this stratum, this path being essentially the same as in Fig. 2, while, however, other photographs with wedge-shaped cover glass can readily be interchanged.

The apparatus in Figs. 4 and 5 produces a virtual image with a single lens $l$, and it renders viewing with both eyes possible. A mirror $m$ can be set, so that it reflects light from the sky through the openings $n$ and $o$, the images $n^1$ and $o^1$ of which as projected by the reflecting prisms $p$ and $q$, represent the entrance pupils and lie in the focal plane of the lens $l$. As the entrance pupil $n^1$ is as distant from the vertical plane through the axis of the lens $l$ as the eye $r$, the position of which is determined by the mask $t$ designed to fit the face, and the pupil $o^1$ as distant from this plane as the eye $s$, through the combined action of this lens and the picture-film of the photograph $d$, $n^1$ is reproduced at the position of the eye $r$, and $o^1$ at the position of the eye $s$. To each eye by this means the virtual image $d^1$ will be visible as in the monocular arrangement according to Fig. 1. The photograph $d$ and the wedge-shaped cover glass $d^3$ are together placed in a slide or photograph holder $u$.

We claim:

1. In an appliance for reproducing Lippmann photographs by means of reflected light the combination with a photograph holder of a lens system, the axis of which is perpendicular to the plane of the photograph.

2. In an appliance for reproducing Lippmann photographs by means of reflected light the combination with a photograph holder of a lens system, the axis of which is perpendicular to the plane of the photograph and a portion of which is adjacent to the photograph to serve as the illuminating lens system.

3. In an appliance for reproducing Lippmann photographs by means of reflected light the combination with a photograph holder of a lens system, the axis of which is perpendicular to the plane of the photograph and an entrance pupil arranged approximately in the focal plane of the said system.

4. In a binocular appliance for producing a virtual image of a Lippmann photograph by means of reflected light, the combination with a photograph holder of a lens system, the axis of which is perpendicular to the plane of the photograph, a left and a right entrance pupil and means for locating the eyes, the pupils and the eyes lying approximately in the focal plane of the lens system and the distance from the vertical plane through the axis of the said system being approximately the same for the left eye and the right entrance pupil and for the right eye and the left entrance pupil.

AUGUST KÖHLER.
JOHANNES LEHMANN.

Witnesses:
PAUL KRUGER,
FRITZ SANDER.